United States Patent
Baggeroer et al.

(10) Patent No.: US 11,483,349 B2
(45) Date of Patent: Oct. 25, 2022

(54) MULTI-DOMAIN OPERATIONAL ENVIRONMENT UTILIZING A COMMON INFORMATION LAYER

(71) Applicant: Goodrich Corporation, Charlotte, NC (US)

(72) Inventors: Paul A. Baggeroer, Westford, MA (US); Eric E. Thompson, Hollis, NH (US); Christopher M. Jengo, Ayer, MA (US); Suhail Shabbir Saquib, Shrewsbury, MA (US); Kevin J. Whitcomb, Shrewsbury, MA (US); Jason R. Bruni, Westford, MA (US); Kenneth L. Warren, Manchester, NH (US)

(73) Assignee: Goodrich Corporation, Charlotte, NC (US)

( * ) Notice: Subject to any disclaimer, the term of this patent is extended or adjusted under 35 U.S.C. 154(b) by 1331 days.

(21) Appl. No.: 15/863,676

(22) Filed: Jan. 5, 2018

(65) Prior Publication Data
US 2019/0215338 A1    Jul. 11, 2019

(51) Int. Cl.
*H04L 9/40* (2022.01)
*G06Q 10/06* (2012.01)
(Continued)

(52) U.S. Cl.
CPC ............. *H04L 63/20* (2013.01); *G06Q 10/06* (2013.01); *G06Q 10/06316* (2013.01);
(Continued)

(58) Field of Classification Search
CPC ...... H04L 63/20; G06Q 10/06; G05D 1/0088; G05D 1/0027; G05D 1/0011; H04B 7/18506
See application file for complete search history.

(56) References Cited

U.S. PATENT DOCUMENTS 6,122,572 A * 9/2000 Yavnai ................. G05D 1/0088
342/13
9,696,409 B2   7/2017 Fox et al.
(Continued)

FOREIGN PATENT DOCUMENTS

CN            107272030 A     10/2017
WO    WO-2004013782 A1     2/2004

OTHER PUBLICATIONS

Extended European Search Report for European Patent Application No. EP19150355.6, dated Apr. 1, 2019.
(Continued)

*Primary Examiner* — Benjamin P Lee
(74) *Attorney, Agent, or Firm* — Locke Lord LLP; Scott D. Wofsy; Judy R. Naamat

(57) ABSTRACT

A multi-domain operational system is provided. The system includes a data collection engine configured and operable to collect operational data from one or more collection resources within time constraints imposed by operational requirements. The system further includes a business rules engine configured and operable to execute a plurality of rules each of which comprise a plurality of conditions grouped in a sequence by a set of logical connectors. The plurality of rules are associated with a mission task. The system also includes a security engine configured to facilitate information sharing across multiple security domains based on one or more security protocols. The system further includes a mission manager software component configured and operable to manage operation of at least the data collection engine, the business rules engine and the security engine using a common information layer.

16 Claims, 11 Drawing Sheets

(51) Int. Cl.
  *G06F 16/835* (2019.01)
  *G06N 3/02* (2006.01)
(52) U.S. Cl.
  CPC .............. *G06F 16/835* (2019.01); *G06N 3/02* (2013.01); *G06Q 10/0633* (2013.01)

(56) References Cited

U.S. PATENT DOCUMENTS

| | | | |
|---|---|---|---|
| 9,734,455 | B2 | 8/2017 | Levinson et al. |
| 10,776,316 | B2 | 9/2020 | Baggeroer et al. |
| 10,907,940 | B1* | 2/2021 | Parker .................... F41H 11/02 |
| 2009/0064169 | A1* | 3/2009 | Nguyen ................ G01S 13/726 718/105 |
| 2009/0254362 | A1 | 10/2009 | Choubey et al. |
| 2009/0326735 | A1 | 12/2009 | Wood et al. |
| 2011/0288692 | A1* | 11/2011 | Scott ....................... H04L 63/20 700/297 |
| 2012/0158699 | A1 | 6/2012 | Creel |
| 2017/0124476 | A1* | 5/2017 | Levinson .............. G01S 17/931 |
| 2017/0316333 | A1 | 11/2017 | Levinson et al. |
| 2019/0213285 | A1* | 7/2019 | Baggeroer ............. G06N 7/005 |

OTHER PUBLICATIONS

Extended European Search Report for European Patent Application No. EP19150352.3, dated Mar. 6, 2019.
Fraga-Lamas, P., et al: "A Review on Internet of Things for Defense and Public Safety", Sensors, vol. 16, No. 10, Oct. 5, 2016 (Oct. 5, 2016), p. 1644, XP055560095, DOI: 10.3390/s16101644; pp. 22-23; figure 12.
Extended European Search Report for European Patent Application No. EP18248254.7, dated Jun. 18, 2019.

* cited by examiner

MULTI-DOMAIN OPERATIONAL ENVIRONMENT UTILIZING A COMMON INFORMATION LAYER

FIELD OF THE INVENTION

Embodiments of the present invention relate generally to an integrated weapon control systems, and specifically to multi-domain operational environment utilizing a common information layer.

BACKGROUND OF THE INVENTION

Currently, automated tools and services utilized by modern integrated warfighting systems have focused primarily on a data layer or the management of raw data and associated data analytics. However, with multi-domain introduction to integrated warfighting, such systems may begin to fail because their decision making cycles, such as OODA (Observe, Orient, Decide, Act) loops, become too slow for the evolving threats. To overcome growing challenges, one priority capability stands out above the others—the ability to operate and fight across all security and derived data domains. Communicating across these domains is challenging due to proprietary or legacy protocols; organizational doctrine and tactics, techniques, procedures (TTP's); and security policy. No matter how advanced data analytics, network infrastructures or machine learning algorithms become, without a common information layer focused on operational workflows to act upon the extracted information, it is very difficult to transition the integrated warfighting systems into fully autonomous or even semi-autonomous loop workflows.

It is desirable to have integrated warfighting systems that are well equipped to move beyond just data collection and traditional sensor and intelligence processing to information creation, dissemination, and decision-making at the speed of data collection. In other words there is a need for an integrated, multi-domain information layer capable of autonomous operations to shorten the decision making cycles of future battle management workflows.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a multi-domain operational system is provided. The system includes a data collection engine configured and operable to collect operational data from one or more collection resources within time constraints imposed by operational requirements. The system further includes a business rules engine communicatively coupled to the data collection engine. The business rules engine is configured and operable to execute a plurality of rules each of which comprise a plurality of conditions grouped in a sequence by a set of logical connectors. The plurality of rules are associated with a mission task. The system also includes a security engine communicatively coupled to the data collection engine and the business rules engine. The security engine is configured to facilitate information sharing across multiple security domains based on one or more security protocols. The system further includes a mission manager software component communicatively coupled to the data collection engine, the business rules engine and the security engine. The mission manager software component is configured and operable to manage operation of at least the data collection engine, the business rules engine and the security engine using a common information layer.

In another aspect, a computer program product for multi-domain operational system is provided. The computer program product includes one or more non-transitory computer-readable storage devices and a plurality of program instructions stored on at least one of the one or more computer-readable storage devices. The plurality of program instructions include program instructions to collect operational data from one or more collection resources within time constraints imposed by operational requirements and program instructions to execute a plurality of rules each of which comprise a plurality of conditions grouped in a sequence by a set of logical connectors. The plurality of rules is associated with a mission task. The plurality of program instructions further includes program instructions to facilitate information sharing across multiple data domains based on one or more security protocols and program instructions to at least manage collection of the operational data, manage execution of the plurality of rules and manage information sharing across multiple data domains using a common information layer.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
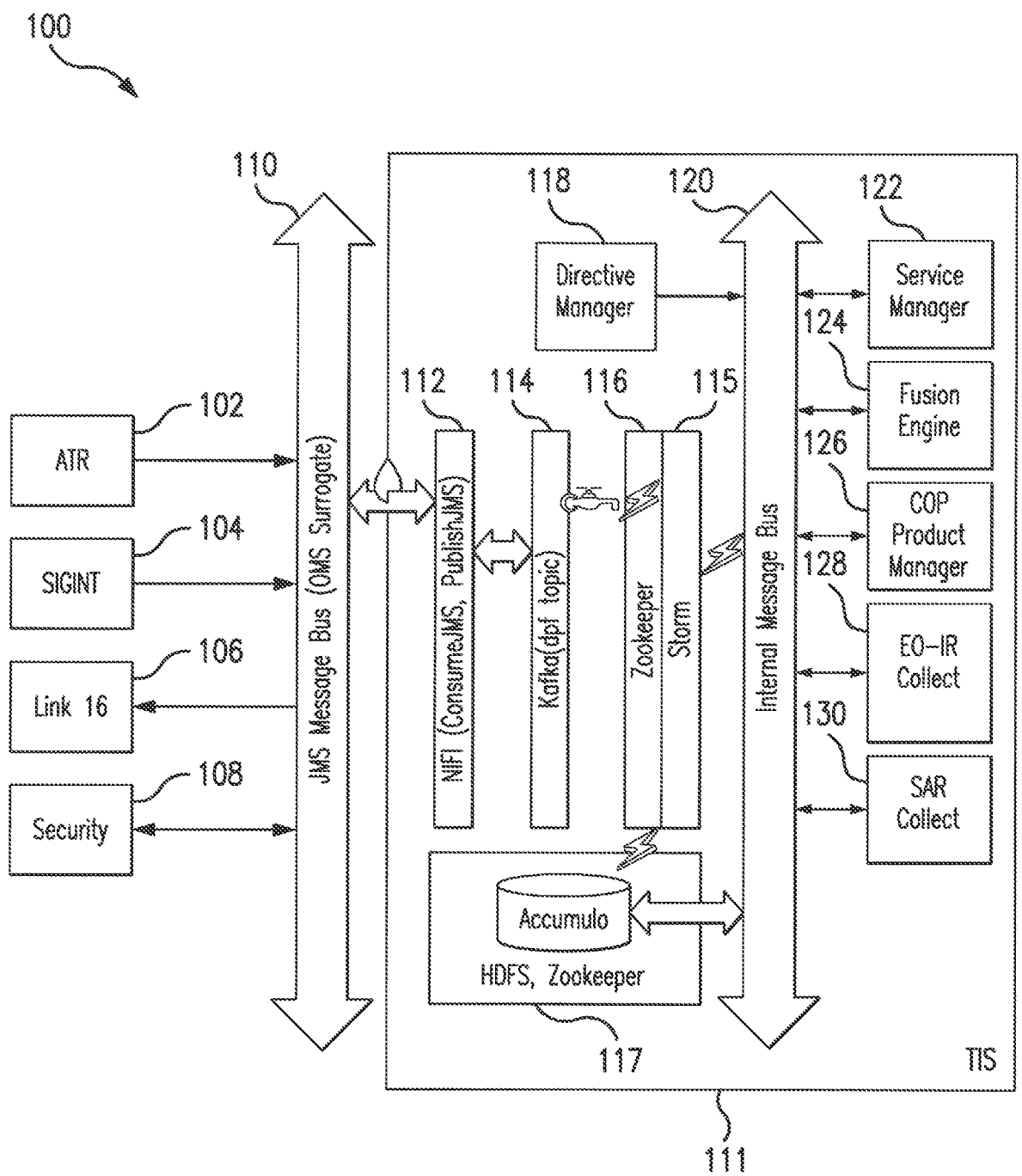
FIG. 1 is a block diagram of an exemplary automated multi-domain operational services system's architecture according to embodiments of the present invention.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a". "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

Embodiments of the present invention are directed to an integrated, multi-domain information layer that employs a data construct (hereinafter referred to as a "Multi Domain Service Construct" (MDSC)). MDSC is a construct comprising a collection of functionalities, platforms and services that collectively create a multi-node information layer configured to support autonomous intelligence, surveillance, and reconnaissance (ISR), kinetic "Kill Chain", and battle management operations in degraded environments. These automated capabilities of MDSC not only enable the defeat of agile intelligent targets in the significantly condensed timelines required, but also support more conventional ISR and battle management workflows by reducing the need for manual, resource intensive processes. Advantageously, by forming a common metadata structure at the disclosed information layer, focused primarily on target centric rules management, MDSC is enabled to leverage a variety of open source workflow tools, cloud architectures and currently available autonomous technologies to automate real world operational workflows.

Embodiments of the present invention contemplate an information layer capable of ingesting, structuring and ultimately acting upon information extracted from the data layer, regardless of the data layer source. Additionally, embodiments of the present invention are directed to a set of services (hereinafter referred to as Automated Data to Decision Operational Services, or "ADOS"). Through its common storage foundation and schematized data ADOS is designed to enable scalable and flexible workflows through the integration of operationally realistic business rules logic, a common data structure, data fusion services and a plurality of support services.

With reference to FIG. 1, a block diagram of an exemplary automated multi-domain operational services system's architecture is provided, according to embodiments of the present invention. It should be understood that this and other arrangements described herein are set forth only as examples. Other arrangements and elements (e.g., machines, interfaces, functions, orders, and groupings of functions, etc.) can be used in addition to or instead of those shown, and some components may be omitted altogether. Further, many of the components described herein are functional entities that may be implemented as discrete or distributed components or in conjunction with other components, and in any suitable combination and location. Various functions described herein as being performed by one or more components may be carried out by hardware, firmware, and/or software. For instance, various functions may be carried out by a processor executing instructions stored in memory.

As shown in FIG. 1, the automated multi-domain operational services system's architecture 100 includes external services 102-110, tactical cloud components 112-117, ADOS core services components 120-126 and additional services components 118 and 128-130. It should be understood that the architecture 100 shown in FIG. 1 is an example of one suitable multi-domain operational services architecture. The architecture 100 should not be interpreted as having any dependency or requirement related to any single module/component or combination of modules/components illustrated therein. Each may comprise a single device or multiple devices cooperating in a distributed environment. For instance, a fusion engine 124 may comprise multiple devices arranged in a distributed environment that collectively provide the functionality described herein. Additionally, other components not shown may also be included within the architecture.

The architecture 100 includes a number of external services, such as Automatic Target Recognition (ATR) modules 102, SIGnal INTelligence (SIGINT) modules 104, tactical data link network 106, such as Link 16, security engine 108, etc. Although only four external services/modules are shown in FIG. 1, it should be understood that in practice, multi-domain operational services systems may include a larger number of external services. Each of the external modules 102-108 are responsible for running service applications that provide some service to the disclosed information layer, in accordance with embodiments of the present invention.

In an embodiment, the ATR module 102 processes data acquired by external sensors (not shown in FIG. 1). As used herein, the term module may include any combination of hardware, firmware, and software to implement the functions described. For example, the ATR module 102 may receive a video signal from the unmanned air vehicles (UAVs) (not shown). The ATR module 102 includes instructions to analyze the video/image and other types of signals to generate an output, such as a raw data tag described below, that it sends to the tactical cloud components 112-117. The video/image or 1-d signals are generated by the sensors described above, and may also be generated by other platforms and sensors observing the target, such as ground-based observers, radar, satellites, etc. All of these signals include information about the states of the UAV and the target, which may include position, orientation, heading, speed, acceleration and/or other kinematic states, size, type and/or class of the target, and other states. Only sensors and services local to the platform will have information about the state of the UAV. In various embodiments, raw data tags are ideally produced from automatic target recognition (ATR) algorithms, but can also be generated from contemporary reporting products or a plurality of other target centric analytics depending on the operational architecture 100. Raw data is collected by the external sensors. This raw data is used by ATR modules 102 to derive detection tags 414 (described below). This data collection and ATR processing happens in the data layer 502 (shown in FIG. 5). The detection tags 414 are later fused by the fusion engine 124 in the information layer 504 (also shown in FIG. 5).

Signal intelligence (SIGINT) is the process of gathering radio frequency (RF) signals and gaining intelligent insight from them. The use of SIGINT in real time by one or more SIGINT modules 104 can identify all RF carriers that are in the immediate area. Capturing an instantaneous spectral snapshot shows the full threat spectrum and the relative power of each RF signal. The SIGINT module 104 may employ one or more software algorithms capable of automatically extracting target information from an unstructured signal. At least in some embodiments, the multi-domain operational services system's architecture 100 may include one or more of: IMagery INTelligence (IMINT) modules. Electronic INTelligence (ELINT) modules. Measurement And Signature INTelligence (MASINT) modules, and the like, instead of or in addition to the SIGINT module 104. The SIGINT module 104 may also be configured to send gathered intelligence information to the tactical cloud components 112-117.

Link 16 is a secure, jam-resistant, tactical digital information network that uses a time division multiple access (TDMA) network signaling protocol. See, C. Kopp, "Network Centric Warfare Fundamentals." Part 3, Defense Today Magazine. NCW 101 Networked Operations (2005), pages 12-19; and Northrop Grumman, "Understanding Voice and Data Link Networking," pages 2-1 to 2-76 (December 2013), both of which publications are incorporated by reference. Link 16 network 106 also uses frequency division multiple access (FDMA) and code division multiple access (CDMA) waveforms so that members of the network can exchange situational awareness data securely in a tactical environment. Most transmissions by users of Link 16 terminals comprise broadcast message data, i.e., message data intended for reception and use by all network members. The data is transmitted in the form of pulses that are modulated by minimum shift keying (MSK) on a radio frequency (RF) carrier signal, usually in a RF band allocated for radio navigation. The data format is known as tactical digital information link-J series, or TADIL-J, as defined in MIL-STD-6016. Specifically, the format is (Jx.y), where x is a defined label of the message (a value from 0 to 31), and y is a message sub-label (a value from 0 to 7). In various embodiments, the architecture 100 may leverage Link 16 network 106 and/or other common communication protocols, such as Common Data Link (CDL) to disseminate the final positive identification (P-ID) of the target or classification tags described below. The security engine 108 is configured to facilitate information sharing across multiple data domains based on one or more security protocols, as described below.

According to an embodiment, the aforementioned external services 102-108 submit/receive/pass data to/from the data analysis system 111 via a messaging layer, such as JMS bus 110, which may provide for event-driven, push communication between the different external modules 102-108 and the tactical cloud components 112-117. Further, the data analysis system 111 may be arranged to receive and transmit data according to dataflow technology 112, such as Task Parallel Library (TPL) Dataflow or NiFi, among examples. The platform may take other open-source forms as well. The tactical cloud components 112-117 may be configured according to various (near) real-time message handling and data stream processing applications technologies, one example of which is Apache Kafka 114. The tactical cloud components 112-117 may further include an open source Apache Zookeeper 116, which is a highly reliable distributed coordination server and real-time streaming distributed computing system 115, such as Storm.

In one embodiment an open source database solution on top of HDFS (Hadoop Distributed File System), known as Apache Accumulo, may be used for an operational data store 117 that could address the needs of the multi-domain operational services system 100. Accumulo is a sorted, distributed key/value store largely based on Google's Bigtable design. Apache Accumulo is within a category of databases referred to as NoSQL databases, which are distinguished by their flexible schemas that accommodate semi-structured and unstructured data. They are distributed to scale well horizontally, and they are not constrained by the data organization implicit in the SQL query language. Compared to other NoSQL databases. Apache Accumulo has several advantages. It provides fine-grained security controls, or the ability to tag data with security labels at an atomic cell level. This feature enables users to ingest data with diverse security requirements into a single platform. Accumulo datastore 117 provides an ability to retrieve data that may be physically stored across multiple servers. It also simplifies application development by pushing security down to the data-level. Accumulo has a proven ability to scale in a stable manner to tens of petabytes and thousands of nodes on a single instance of the software. It also provides a server-side mechanism (Iterators) that provides flexibility to conduct a wide variety of different types of analytical functions. Accumulo data store 117 can easily adapt to a wide variety of different data types, use cases, and query types.

ADOS core services components 120-126 include a service manager 122 configured to leverage operationally derived business rules logic to drive the internal open source workflows. The service manager 122 generates one or more classification tags 415 described below. Another core services component, a fusion engine 124, is configured to compile and combine available target related information. The fusion engine 124 generates one or more fused detection tags described below. Yet another core services component, a Common Operational Picture (COP) product manager 126 is configured to support the need for human-on-the loop inputs and oversight. In one embodiment, the COP product manager 126 is configured to provide a standard protocol for exporting relevant information for operational COP displays. According to an embodiment of the present invention, the aforementioned core services components 122-126 may be coupled to an internal message bus 120. In various embodiments, the internal message bus 120 may be modified to fit a specific environment.

According to an embodiment of the present invention, additional services components include a directive manager 118. The directive manager 118 is the executive function of ADOS. The directive manager 118 is configured to handle the interactions with other services and directs the capabilities (platform asset tasking, processing algorithms, fusion, etc.) that are available. One or more collection managers 128-130 are other peripheral services for ADOS that manage the interactions with their respective areas of expertise. The collection managers 128 are configured to handle sensor data collection on the platform or potentially beyond, depending on the enterprise configuration. In one embodiment, collection managers may include an EO-IR collection manager 128 configured to handle electro-optical infrared (EO/IR) sensor data and a SAR collection manager 130 configured to handle Synthetic Aperture Radar (SAR) imagery data.

According to an embodiment of the present invention, the directive manager 118 may generate a requirement tag that includes the geographic region of interest (ROI) and targets of interest. Then the service manager 122 may use this requirement tag, to initiate and execute the internal workflow processes. In various embodiments, such requirement tags clearly identify priority, reporting procedures and dissemination instructions. In some embodiments, original requirement tags may be automatically generated through a requirement tool.

The following is an example of an area based requirement tag that would enable automated ISR and collection management operations:

ISR Request: locate and report priority targets by location, number, disposition and probability of identification in geographical zone x,y/x,y/x,y/x,y.

Priority Target List: 001 Target A; 002 Target B; 003 Target C

Target Threshold and Dissemination: All positive reporting of priority target with a probability of greater than 70% shall be broadcast via Link 16 COMMs and published to AOC targeting cell COP (link permitting). All positive reporting with a probability less than 70% by conclusion of requirement window shall only be published to DCGS COP.

Rules of Engagement (ROE):
Electronic Order of Battle (EOB):
Requirement Window:
Start: 15 Dec. 2019 1200Z
Close: 15 Dec. 2019 2100Z.

In this example, the exemplary ISR request requires obtaining data over a bounded search area and is open to all available ISR assets. The priority target list scopes the workflows executed by the system. In other words, the priority target list enables the service manager 122 to prioritize workflow processing and data collection requests as well as provides mission manager components 228 and auto router components 246 (described below) to identify correct sensor/platform combinations on per target type basis. In this example, ROEs provide requirements for collection and dissemination. For example, ROEs may specify whether a literal image of a target is required or whether there is a requirement for human in the loop validation. The exemplary requirement window bounds automated collection requests and processing temporally and ensures that each requirement expires at some point in time, which eliminates contemporary problem of stale requirements. EOB identifies priori known threats, keep out zones, etc. in the ROI.

Once ADOS service components 118-130 receive requirements tags 402, their functions are essentially limited to information structuring and fusion that formats the results of any domain's data following information extraction into detection tags 414.

These detection tags 414 form the basis of the information structuring approach employed by the disclosed system. Advantageously, the use of metadata formatted detection tags 414 by the ADOS core services components 120-126, as opposed to more computationally intensive and cost prohibitive data level approaches, allows these service components to perform complex multi-domain data fusion on almost any military architecture, including limited airborne processing nodes. Furthermore, the rules logic employed by the service manager 122 facilitates interoperation and communication with other supported services directed to locate, task or otherwise retrieve additional source of information related to the target in question.

According to an embodiment of the present invention, as service manager 122 continues to generate additional detection tags 414, the fusion engine 124 is configured to combine various information in order to create one or more fused detection tags. This process typically continues until the requirement specified in the requirement tag 402 is satisfied or until a predefined time limit (e.g., the limit provided by the requirement window) is reached. Once the requirements are satisfied, the directive manger 118 generates one or more classification tags 415. The classification tags 415 are used primarily to disseminate the final positive identification of the target of interest. The positive identification could then be used in any number of ways by the person or system that was seeking that target. These tags may include, for example, the individual product probability information, intelligence source type information and symbolic link to raw data the fusion engine 124 used to achieve its fused product. These classification tags 415 simplify the human on the loop validation process.

Once the classification tags 415 are generated, the system 100 employs standardized communication services that support Link 16 network 106, CDL and/or other common communication protocols to disseminate the final P-ID or classification tags 415. This type of information structuring provides a capability to conduct single platform, multi-domain autonomous identification of priority targets and provides the ability to pass generated information to strike capable assets in real time using the combat cloud network 216 (described below), tactical cloud components and machine to machine technologies already in place.

Figure 2:
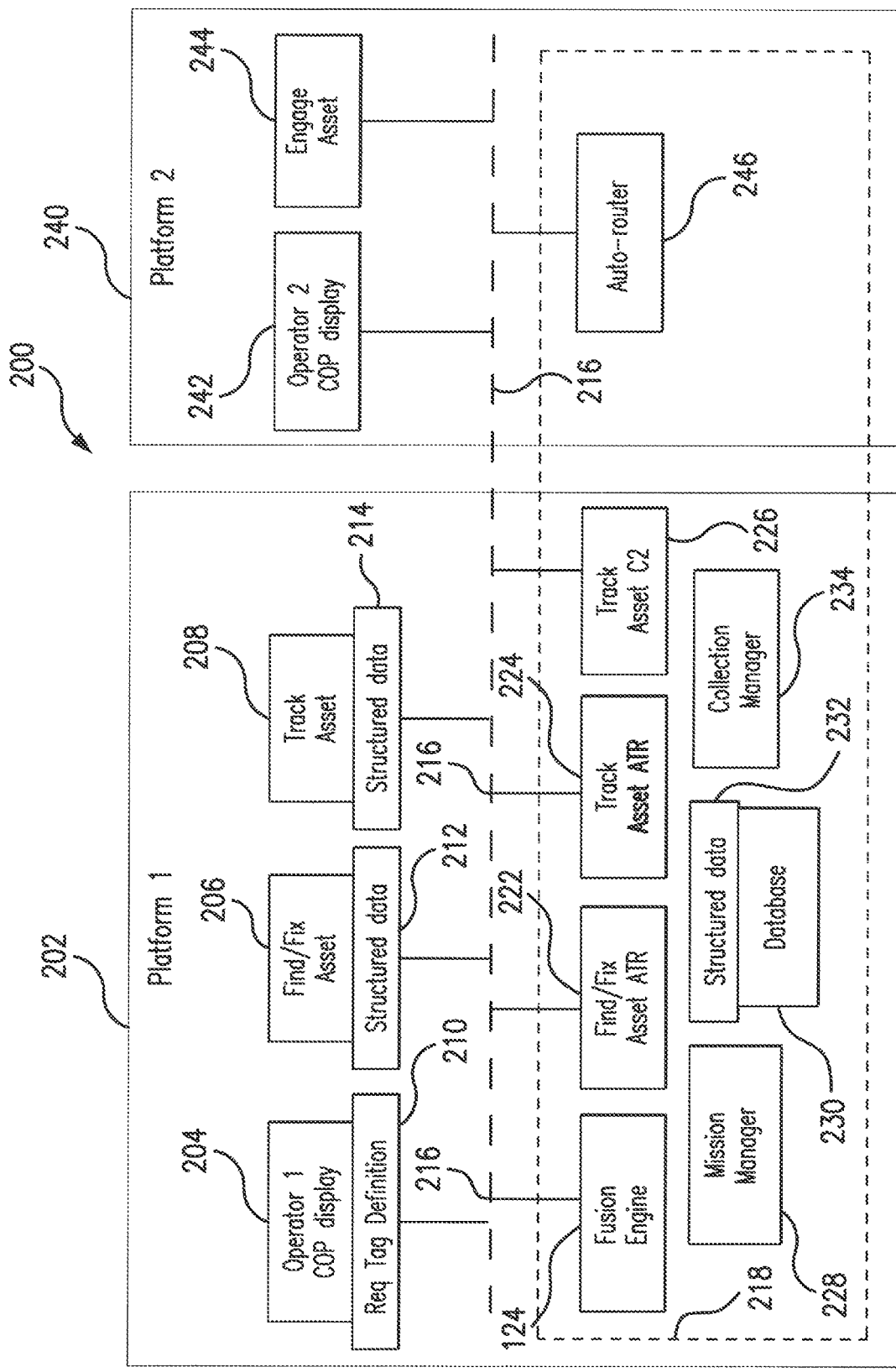
FIG. 2 illustrates a multi-domain information layer in a distributed cloud computing platform in accordance with an embodiment of the present invention.

FIG. 2 illustrates a multi-domain information layer in a distributed cloud computing platform in accordance with an embodiment of the present invention. As Internet technology has advanced, it has become more feasible to provide web services that can automatically scale upon user demand, often by use of various types of automated service provisioning methods and virtual machine migration methods. These scalable cloud services are described by Zhang et. al., "*Cloudcomputing: state-of-the-art and research challenges*". J Internet Serv. Appl. (2010) 1: 7-18. These cloud services include Amazon EC2. Microsoft Windows Azure platform, the Google App Engine, and others. For the purposes of illustrating embodiments of the present invention, a cloud computing platform comprises a set of connected horizontally scalable services which may or may not be present in any particular implementation.

The cloud computing platform 200 expands capabilities of the disclosed system beyond the core utility through one or more add-on services. The use of the cloud computing technology enables additional capabilities, such as, but not limited to, distributed databases, data replication and distributed processing. The example shown in FIG. 2 illustrates interconnection of two different platforms 202 and 240 via the cloud computing platform. A first platform 202 provides different ATR services for a find/fix (intelligence) asset 206 and a track (Battle Management Command and Control (BMC2)) asset 208, such as, a find/fix asset ATR module 222 and a track asset ATR module 224. Additional services provided by the first exemplary platform 202 may include track asset C2 (command and control) module 226, fusion engine module 124, mission manager module 228 and collection manager module 234. The track asset C2 module 226 is configured to provide C2 functions. It should be noted that since embodiments of the present invention enable information sharing and collaboration across multiple domains, these embodiments enable sharing and collaboration of the C2 functions as well.

According to an embodiment of the present invention, mission managers 228 are functional components that operate at a level above the multi-domain information layer—at the command and control layer. Mission manager modules 228 may be configured to track all the platforms (i.e., the first platform 202 and the second platform 240) operating in the ROI, their location, and each platform's capabilities. It should be noted that each platform 202, 240 is configured to periodically broadcast its own location, capabilities, and payload capabilities to the mission manager 228. This information sharing enables the mission manager module 228 to effectively receive tasks (requirements) and manage various theater platforms. The mission manager module 228 processes and utilizes all received information in order to satisfy as many received requirements as possible. In some embodiments, the mission manager modules 228 may be operatively connected to a COP display 204 which may allow a human user interaction with the automated platform. Such connection may allow users to maintain insight into what is being autonomously accomplished and allow users to interject changes as needed.

At least in some embodiments, collection manager module's 234 functionality may include assignment of assets, organizations and people best suited to answer the commander's intent. This intent to requirement translation logic may be critical for some missions and typically would require the collection manager 234 to be aware of each data collection capable asset's availability and capabilities.

The first platform 202 may further include a database 230 for storing structured data 232 utilized by the various services 124, 222-228 and 234. In one embodiment, the database 230 may comprise an Accumulo datastore 117 described above in conjunction with FIG. 1. Users may utilize the COP display 204 to provide requirements necessary for a structured requirement tag generation 210. In addition, other assets, such as the find/fix asset 206 and the track asset 208 may also communicate with the services provided by the first platform 202 using various structured data 212 (such as various data tags described herein).

The second platform 240 also includes a COP display 242 and includes an engage asset module 244 which may be configured to prosecute a target of interest. In most cases, the engage asset module 244 should not need an actual image of the target. The geolocation, target type, and track overlaid onto their available maps provided by other components of automated system should be sufficient to engage. The only service provided by the second platform 240 is auto-router 246.

According to an embodiment of the present invention, auto-router modules 246 also play a key role along with the mission manager modules 228 in autonomous operation of the multi-domain operational services system 100. Auto-router modules 246 are substantially essential components because platforms such as the second platform 240 need to be aware of their own capabilities such as, but not limited to maximum acceleration, maximum braking (deceleration) rate, maximum speed, minimum speed, minimum turn radius, maximum range, maximum endurance, mission sensors performance, maximum payload weight, payload type, communications system type (e.g., types available under current conditions), maximum climb rate, and other or additional static and dynamic platform performance metrics and/or limits. Auto-router modules 246 may also need the terrain information and the weather information in order to efficiently and autonomously route the platform 240 to an area of interest.

According to an embodiment of the present invention, the auto-router module 246 is configured to leverage the received information to ingest targets of interest (requirements) and efficiently and autonomously generate an ideal collection route based on platform's capabilities. In various embodiments, the auto-router module 246 may be configured to accept requirements both externally from the mission manager module(s) 228 and internally from its own payload(s) when an area of interest is identified and broadcast over the network, such as the combat cloud network 216. Once the auto-router module 246 generates a route, it may broadcast its calculated time to capture of the intended target as well as platform and payload capabilities over the cloud network 216 for consumption by the mission manager module(s) 228 in order to coordinate the battle space.

FIG. 2 illustrates scalability of the disclosed architecture. The combat cloud network 216 comprises a set of connected horizontally scalable services which may or may not be present on any particular platform. In FIG. 2, the second platform 240 may comprise an edge node (e.g. an airborne platform). As an edge node, the second platform 240 may only require a limited set of cloud services (e.g., just the auto-router module 246) to handle real-time metadata tagging or routing of incoming sensor data. The first platform 202 may be a ground node and may require extensive resources and services to process metadata being received from many edge nodes, similar to the second platform 240. In some embodiments, a large scale ground node may also be tasked with batch analytics (continuous background processing of existing data) as well as supporting interactive analytics.

The distributed cloud computing platform 200 is designed to operate with integrated workflow- and operator-specified business rules using the standard combat cloud network 216 to connect multiple assets (e.g. assets 206, 208, 244) and to connect multiple operators (e.g., operators at a first COP display 204 and a second COP display 242).

Advantageously, the exemplary platforms 202, 240 utilize a common information layer provided by ADOS (shown as structured data 210, 212 and 232 in FIG. 2). This allows for the creation of data layers independent of each individual service, and enables integration of various services throughout various desirable architectures. It should be noted that full integration of automated services may require corresponding modifications to the workflow and rules logic in order to achieve an optimal service package. Advantageously, the multi-domain information layer 210, 212, 232 becomes more robust and operationally relevant as additional platforms join the combat cloud network 216 and as distributed workflows become consolidated.

The MDSC construct providing the multi-domain information layer is designed to efficiently integrate with many existing platform to platform communication interfaces, such as Open Mission Systems (OMS). OMS provides a standard messaging interface for command and control of mission system and provides a machine-to-machine interaction between airborne systems and ground stations, for example. OMS typically utilizes Unmanned Aerospace system (UAS) Command & Control (C2) Standard Initiative (UCI). In the embodiments where the MDSC does not utilize OMS/UCI, adapters can be leveraged to interface OMS services with platform specific API's. However, such integration with OMS services is not necessarily required for use of the MDSC in a standalone environment. It is further noted that to maximize various autonomous capabilities of the system some specific policies may be required to enable multi-domain information sharing and C2 across the warfighting enterprise.

Figure 3:
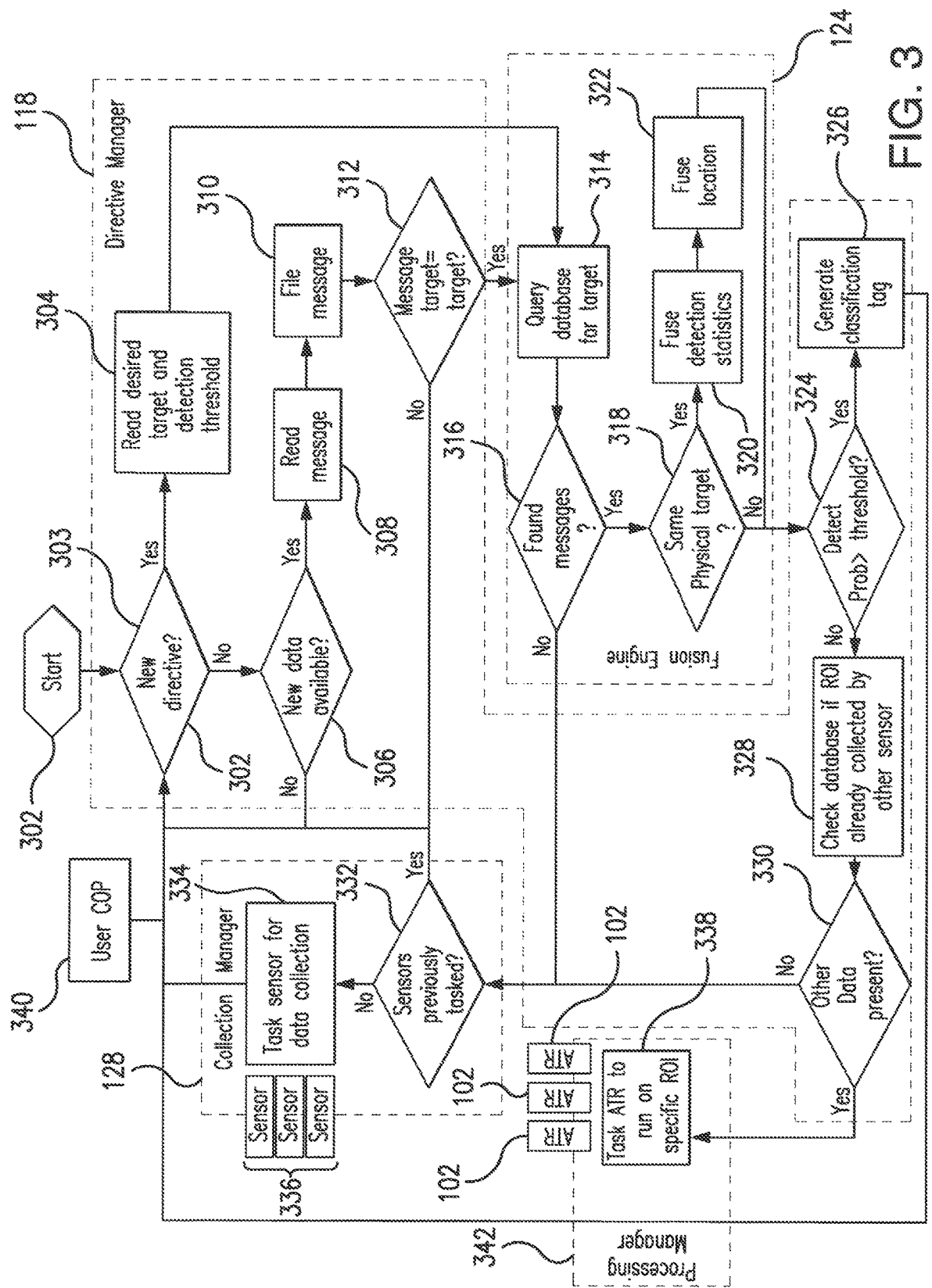
FIG. 3 is a flowchart illustrating operational steps performed by various functional components of FIG. 1 in accordance with an embodiment of the present invention.

ADOS is the subset of MDCS that facilitates near real time decision making by supporting operational workflows across multiple data domains through data structuring and fusing the information in the metadata. FIG. 3 is a flowchart illustrating operational steps performed by various functional components of FIG. 1 in accordance with an embodiment of the present invention. As noted above, the directive manager module 118 is the executive function of ADOS. After start 302, at step 303, the directive manager 118 determines if a new directive has been received. This new directive may be received in the form of requirement tag 402 generated by users 340 who are looking for information. In an embodiment of the present invention, the requirement tag 402 contains a request to find particular information related to a particular target. For example, the requirement tag 402 may contain a request to find a red truck within a particular bounded area in the next four hours. The requirement tag 402 preferably includes a termination field containing search termination criteria (e.g., stop search once the target is found, search for four hours, etc.). Consumers of the requirement tags 402, such as the directive manager module 118, may be configured to query the data domain for information and process the information if necessary to satisfy the specified requirements.

In response to determining that a new directive has been received (decision block 303. "Yes" branch), at step 304, the directive manager 118 parses the received requirement tag to identify desired target and the requested detection threshold. Such detection threshold may be set by ROE, for example. Once the directive manager 118 obtains relevant target and detection threshold information, it sends instructions to the fusion engine 124 to search the database and fuse information if relevant data is found.

In response to determining that no new directive has been received (decision block 303, "No" branch), at step 306, the directive manager 118 determines if any new data is available. According to an embodiment of the present invention, data collected in various data domains may be exposed across domains through the use of a raw data tag 406 (which may be similar to OMS/UCI entity tag). Advantageously, the raw data tag 406 is accessible from all domains because it contains no raw data, sources, or methods. The raw data tag 406 makes consumers aware that specific information exists in the system, just like a hyperlink, for example. In various embodiments the raw data tag 406 may include basic information such as time and location of data collection.

In response to determining that no new raw data tags have been received (decision block 306, "No" branch), the directive manager 118 returns back to step 303 and waits for new requirement tags 402. Otherwise. (decision block 306, "Yes" branch), the directive manager 118 reads a message provided by the collection manager 128, for example (step 308). At step 310, the directive manager 118 stores the received message in a datastore, such as Accumulo 117. At step 312, the directive manager 118 determines if the data contained in the received message is related to the target of interest specified in the received requirement tag 402. If the received message is not related to the target of interest (decision block 312, "No" branch), the directive manager 118 returns back to step 306 to determine if there are any additional raw data tags 406 are available. In response to determining that the received message is related to the target of interest (decision block 312. "Yes" branch), the directive manager 118 sends instructions to the fusion engine 124 to search the database and fuse information accordingly.

As noted above, the fusion engine 124, is configured to combine available target related information. At step 314, the fusion engine 124 receives instructions from directive manager 118 and retrieves all available target information from the database at step 314. At least in some embodiments, the database may comprise the Accumulo datastore 117 shown in FIG. 1. The fusion engine 124 is a service that contains the logic to fuse multiple detection tags and is able to recognize and initiate queries if no information is found regarding the target of interest in the ROI. Thus, at step 316 the fusion engine 124 determines if no relevant data is available and generates a collection request tag 404 and sends it to the collection manager 128. Collection request tags 404 can be generated by the fusion engine 124 if no data exists across the domains that can satisfy current requirements.

According to an embodiment of the present invention, in response to determining data is available for the target of interest (decision block 316. "Yes" branch), at step 318, the fusion engine 124 makes a determination whether the multiple detection tags of the target of interest retrieved from the database represent different detects of the same physical target or different physical targets. If the different detection tags are assessed to correspond to the same physical target (decision block 318, "Yes" branch), at step 320, the fusion engine 124 performs fusion of detection statistics followed by fusion of locations statistics, at step 322. It should be noted that steps 318-322 will be explained in greater detail below. Once the fusion engine 124 completes fusion of this information, it generates another detection tag 414 containing fused target geospatial information, probability of target identification, and target track if applicable (e.g., for a moving target). In other words, the result of the fusion process is the generation of a new detection tag 414 representing the fused location, statistics, time and uncertainty.

This is simply another detection tag 414 with reference to the original detection tags used for the fusion process. By fusing information from multiple data sources, the fusion engine 124 increases the confidence of the provided information. The probability of target identification is typically expected to meet established thresholds set by the ROEs. The detection tag 414 generated by the fusion engine 124 and containing fused target information is sent back to the directive manager 118.

At step 324, the directive manager 118 parses the detection tag 414 received from the fusion engine 118 to determine if the probability of target identification is greater than the threshold identified in step 304. In response to determining that the probability of target identification in the received detection tag 414 meets or exceeds the specified threshold (decision block 324, "Yes" branch), at step 326, the directive manager 118 generates a classification tag 415 notifying other components of the system that a target satisfying the received requirement tag has been found. At least in some embodiments, the directive manager 118 disseminates the P-ID or the generated classification tag 415 via the Link 16 network 106 (shown in FIG. 1), for example.

If more data is required to meet thresholds set in the received requirements tags 402, additional collection request 404 and/or processing request 412 tags can be generated by the directive manager 118. Resulting raw data tag/detection tag 406 results can then be fused again by the fusion engine 124 along with existing detection tags 414 to increase confidence in the extracted information. According to an embodiment of the present invention, in response to determining that the probability of target identification in the received detection tag is below the specified threshold (decision block 324. "No" branch), at step 328, the directive manager 118 queries the database again to determine if ROI has already been collected by one of the available sensors. If so, then the ATRs will run on the new data. Otherwise, the sensors will be tasked to collect additional data. Next, at step 330, the directive manager 118 determines whether any additional data related to the target of interest is present in the multi-domain system.

According to an embodiment of the present invention, if additional data is present (decision block 330, "Yes" branch), the directive manager 118 generates a corresponding processing request tag 412 and sends the tag to a processing manager 342. This processing request tag 412 is generated by the directive manager 118 to request information extraction from the available raw data, resulting in a new detection tag 414 which can be fused by the fusion engine 124 with current detection tags 414. Processing request tags 412 can be generated by the directive manager 118 to request that domain owners process raw data with particular parameters to produce information relevant to current information requests. The processing manager 342 is a module configured to handle the various ATR modules 102 that are available in the system 100, and may be configured to perform tasks related to managing processing resources' usage, such as, but not limited to, performing distributive processing, elimination of redundant processing requests, and the like. The processing manager 342 parses the received processing request tag 412 and tasks one of the ATR modules 102 to generate the required information at step 338.

If no data exists across the system that can satisfy current requirements (decision block 330, "No" branch), the directive manager 118 generates a corresponding collection request tag 404 and sends the tag to the collection manager 128. The collection managers 128 are configured to handle sensor data collection. At step 332, the collection manager 128 determines if data collection sensors 336 have been previously asked to produce data requested by the received collection request tag 404. If so (decision block 332, "Yes" branch), no further action is required as this data would already have been processed by the system. In response to determining that the collection sensors 336 have not been previously asked to produce data requested by the received collection request tag 404 (decision block 332. "No" branch), the collection manager 128 tasks one or more of the sensors 336 to collect the required data at step 334.

FIG. 3 illustrates that the ADOS architecture is message driven and includes capability of communicating to external services. Database capabilities within the various embodiments of the present invention are utilized to persist the metadata and detection tags that are consumed and generated by the fusion engine 124. Advantageously, system scalability is achieved by separating the business rules logic from the cloud-native applications and underlying hardware and services infrastructure, such as, for example. Open Architecture-Distributed Common Ground System (OA-DCGS). Services as well as applications have a capability of scaling across new hardware if needed.

Figure 4:
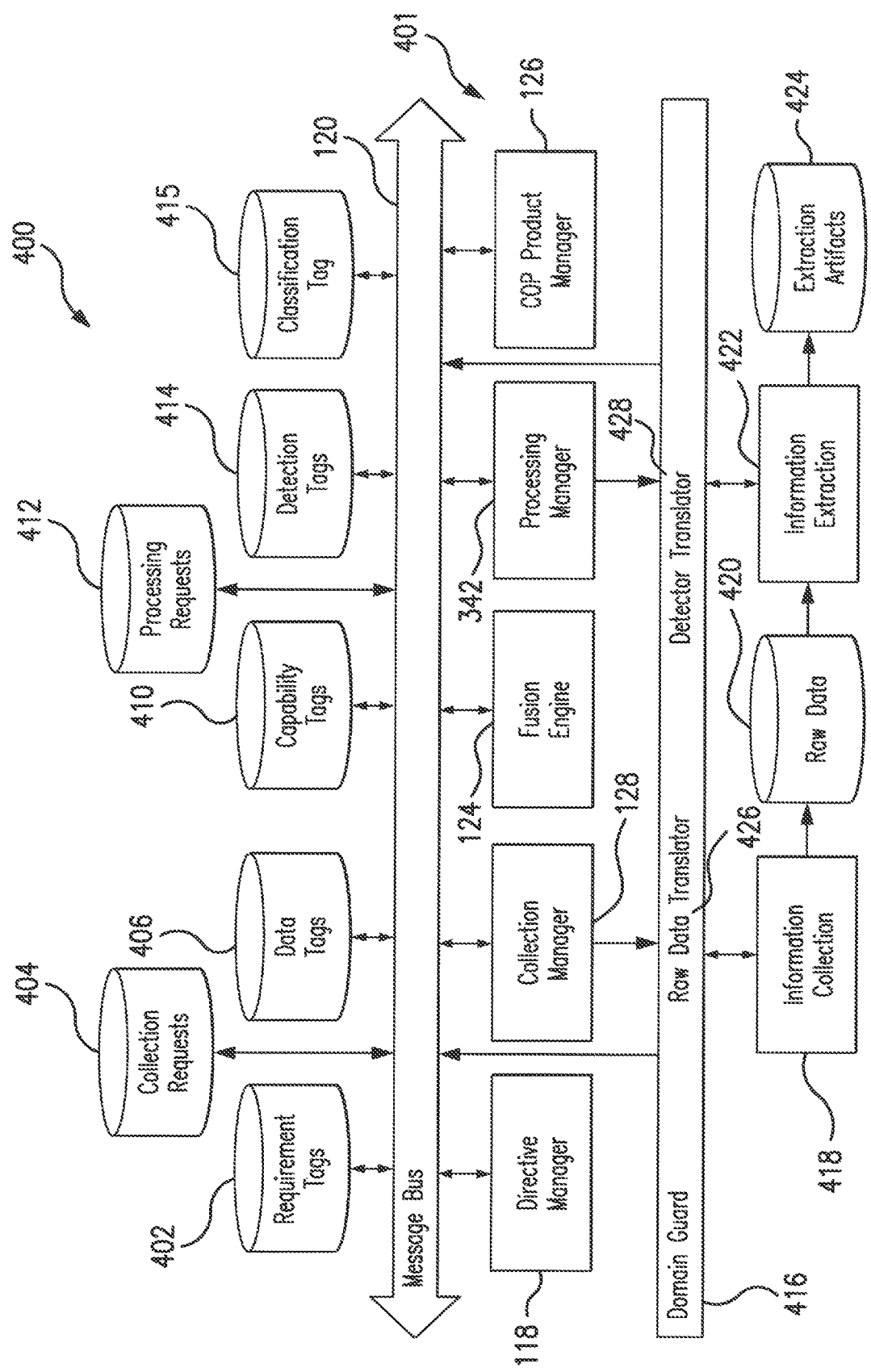
FIG. 4 illustrates a multi-domain information layer schema implemented in a distributed cloud computing environment, in accordance with an embodiment of the present invention.
Figure 5:
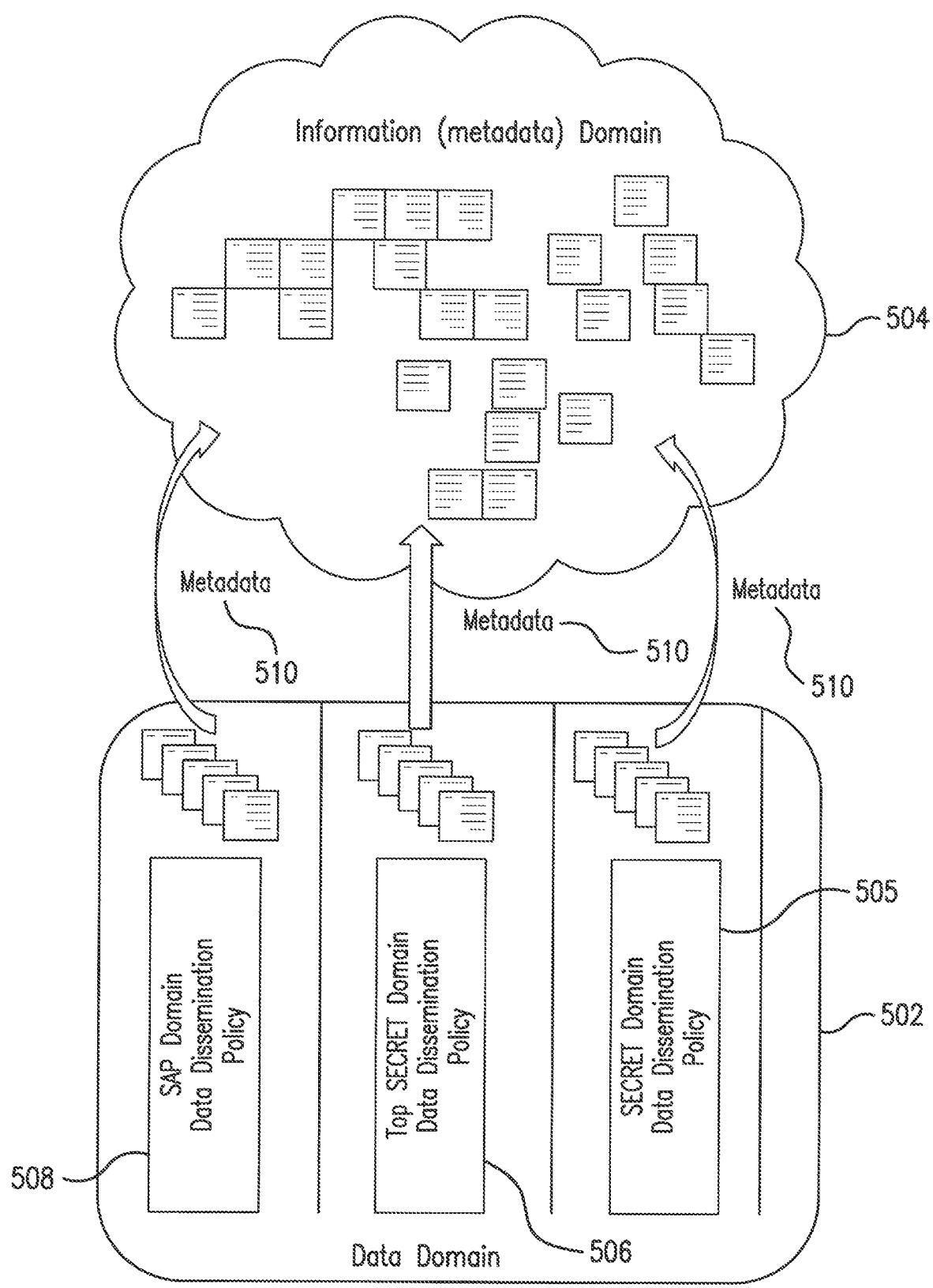
FIG. 5 is a block diagram illustrating transformation of domain-specific data to domain-agnostic information that can be disseminated and leveraged across the multi-domain operational services system, in accordance with an embodiment of the present invention.

FIG. 5 is a block diagram illustrating transformation of security domain-specific data to domain-agnostic information that can be disseminated and leveraged across the multi-domain operational services system 100, in accordance with an embodiment of the present invention. As shown in FIG. 5, the MDSC uses domain-specific data 502 to create domain-agnostic information 504 that can be disseminated and leveraged across the multi-domain operational services system 100. The MDSC is designed to separate (extract) information from data 502 such that it can be easily disseminated and fused with other sources of information or intelligence based on the corresponding data dissemination policies 504, 506, 508 corresponding to each data domain. Each dissemination policy 504, 506, 508 is associated with a particular security domain. Furthermore, MDSC extracts relevant data and encapsulates the extracted information within various metadata tags 510, such that this metadata information 510 can be easily fused in all domains. The metadata tags 510 may be defined in the MDSC schema discussed below in conjunction with FIG. 4. In various embodiments the metadata tags 510 may be constructed in a variety of XML compatible formats and may impose minimal requirements on data structuring. For example, the metadata tags 510 may be constructed using one of the following formats: UCI or Predictive Model Markup Language (PMML).

The size of the metadata tags 510 is generally measured in kilobytes. Advantageously, these metadata tags 510 minimize the amount of data transferred between various components of the multi-domain operational services system 100 while retaining all of the necessary information. In other words, the metadata tags 510 allow a common data format that enables the use of analytics to combine and compare different target detections to classify/identify the target. As explained below, the metadata tags 510 can be moved through each of the plurality of domains. As yet another advantage, the metadata tags include one or more links to provide easy access to the raw data as needed and allowable per security clearance of the person or system seeking access.

FIG. 4 illustrates a multi-domain information layer schema implemented in a cloud network environment, in accordance with an embodiment of the present invention. It should be noted that the information layer schema (also referred to herein as MDCS/ADOS schema) 400 can be (but is not required to be) implemented in a cloud network environment, such as environment 200 shown in FIG. 2. In various embodiments, specific configuration, such as available capabilities, security restrictions, and the like will determine which elements 401 of ADOS and MDCS would be appropriate to include. In the example illustrated in FIG. 4, the raw data 420, extraction artifacts 424, information collection 418 (e.g., by sensors 336) and information extraction 422 (e.g., by ATR modules 102) are separated from ADOS 401 and interact via translators 426 and 428 which structure the metadata. The raw data translator 426 ingests raw data (e.g., a data stream), for example, and generates an outgoing reformatted data that is in the metadata format understandable by the collection manager 128. The collection manager 128 is configured to process the received metadata and generate one or more raw data tags 406. The detector translator 428 ingests information extracted from the raw data storage 420, for example by the ATR modules 102, based on the processing request tags 412 received from the processing manager 342, and generates reformatted raw data that is in the metadata format understandable by the processing manager 342. In response, the processing manager 342 generates one or more detection tags 414.

ADOS 401 exists outside the classified data exchange but can receive the metadata tags via a domain guard 416. The domain guard 416 functions in the data domain and is configured to ensure confidentiality of sources and methods, while mitigating delays. As shown in FIG. 4, the processing manager 302 receives information extracted from the domain-specific data 420 to create the detection tag 414. While the generated detection tag 414 is held within the domain-specific area, it may include all necessary fields contained within (e.g., data sources and methods of collection). The domain guards 416 may also be tasked with moving detection tags 414 from one domain to another. This step would require the domain guard 416 to simply remove data sources and data collection methods from the detection tag's 414 fields in order to disseminate the detection tags 414. Advantageously, such design decreases the domain guard's 416 complexity and processing requirements. Consumers of these detection tags (e.g., other ADOS components) in other data domains typically do not care where the information originated nor require the details of original data set. Consumers of this information just need to know that a particular target has been detected at a given geoposition, at given time and with given statistics.

Examples of metadata tags 510 that may be stored in the database, such as the Accumulo 117 may include, but are not necessarily limited to, requirement tags 402, collection requests 404, raw data tags 406, capability tags 410, processing requests tags 412, detection tags 414, classification tags 415 and similar metadata.

The requirement tags 402 contain information specifying the need, time span, and threshold for confidence in a specific target of interest in a specified geographical area. In some embodiments, the database 117 may contain models for the physical targets (e.g., a red truck). The physical targets may be keyed with models for various ATR modules 102. The ATR modules 102 may have capabilities to specify other unique fields containing target details, such as, but not limited to "moving target", "target with missiles", etc. The requirement tag 402 may also include priority and threshold information. In various embodiments, priority and thresholds could be decided by the COP product manager 126 or by some other criteria. Criteria for changing priorities and when to start/stop requesting collected data should account for a plurality of possible scenarios. For example, different criteria may be needed depending on the availability of various assets. As another example, criteria for changing priorities may vary based on the threshold values. Recipients of requirement tags 402 typically initiate a search (e.g., "find red truck in designated area, between 1300 and 1900 hours") of existing domain-specific data sources, such as the raw data source 420. If data is found containing this information, this information is extracted 422 and passed to the processing manager 342, which generates a detection tag 414 that can add to the fused detection tag's probability.

Collection request tags 404 are used to communicate command and control requests to collect more data when needed to increase confidence in detection. When additional information is required in order to meet the threshold specified by the requirement tag 402 that cannot be found within the pre-existing data, a collection request tag 404 is generated by either the directive manager 118 or by the collection manager 128. The collection request tag 404 may be sent to the mission manager service 228 which needs to prioritize and coordinate collection assets to determine if and when this request can be satisfied. The collection request tag 404 may include information, such as collection priority, as well as expiration criteria (e.g., "last time data is effective") in order to have an elimination policy for stale collection requests. According to an embodiment of the present invention, collection request tags 404 may be stored in the database 117 to allow various services to determine if specific collections have already been requested.

The raw data tag 406 has one primary function—to expose data from various domains (EO, HSI, SIGINT, etc.)—and is sent by the collection manager 128 every time raw data 420 enters the system. The raw data tag 406 informs various services that information may be available to improve the probability of identification. Note that the raw data tag 406 so to speak "exposes" available data, but does not inform the consumer of data's sources or methods of collection. The raw data tag 406 essentially provides information that particular data exist somewhere in the system at a geolocation (e.g., center point) and is associated with particular time of collection. According to embodiments of the present invention, the raw data tag 406 may be stored in a database with a unique identifier and may be associated (e.g., via a hyperlink) with a domain-specific data source. Some details of the data collection may be inaccessible from other data domains, but that is acceptable, since substantially all services just need to know where to point an ATR module 102 so that it can process the data.

Detection tags 414 may be generated by various information extraction services 422, such as ATR modules 102, and other data providers when they register with the system. The fusion engine 124 typically needs to know what information extraction services 422 are available to provide detection tags 414. When these information extraction services 422 are added to the system, they generate and broadcast a capability tag 410 containing information about their capabilities. The capability tags 410 may also be stored in the database 117 to allow the fusion engine 124 to query currently available information extraction services 422.

According to an embodiment of the present invention, various services receiving raw data tags 406 can request processing of the data through the use of the processing request tag 412. Processing is performed by the processing manager 342 in the domain of the information extraction service 422 with only the detection tag 414 being disseminated to other domains. Processing request tags 412 are generated by the directive manager 118 when raw data 420 is available and relevant to the existing requirements contained in the requirement tags 402. At least in some embodiments, the directive manager 118 sends the processing request tags 412 to the applicable ATR modules 102 that are registered with the system 100. In some cases, the processing request tags 412 can be sent by the fusion engine 124 to reprocess pre-existing data with new parameters based on receipt of additional information. For example, if the fusion engine 124 receives a new detection tag 414 indicating the presence of a target at a particular location and previous processing of raw data 420 from a different detector 418 did not indicate a target at that location, the fusion engine 124 may send a processing request tag 412 to reprocess that data in the specific location indicated by the new detection tag 414 to provide additional information which may raise or lower the confidence value of the target detection. As noted above, the processing manager 342 is configured to handle the administrative tasks such as eliminating redundant processing requests if they are queued and not immediately available.

Figure 6:
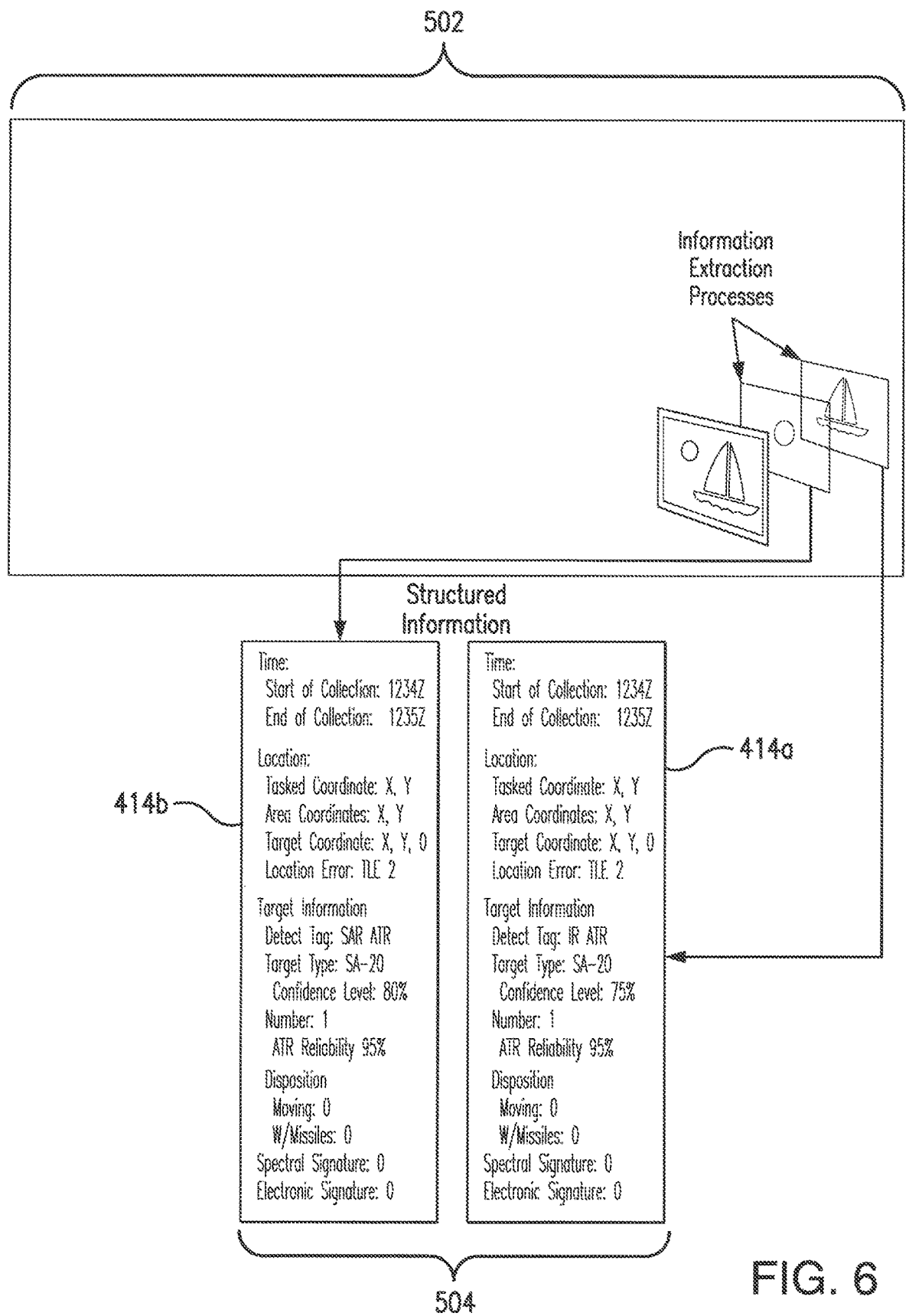
FIG. 6 illustrates generation of a detection tag, in accordance with an embodiment of the present invention.

FIG. 6 illustrates generation of a detection tag 414, in accordance with an embodiment of the present invention. The detection tag 414 contains information providing details of unique target detection. Such information may include, but is not limited to, a level of confidence (e.g., probability), target type (e.g., red truck), target description, geolocation, time, status (e.g., parked), and optionally data sources/methods of collection. Advantageously, the disclosed detection tags 414 structure this information so that machine-based, multi-domain fusion can occur.

There may be some status/disposition fields within the detection tag 414 that are unique to a particular target (e.g., "moving target", "target with missiles", etc.). For moving targets, multiple detection tags 414 can be fused by the fusion engine 124 to provide a track or pattern of life information. In the aforementioned example, the detection tag 414 may contain some missing information fields (e.g., data source geoaccuracy information), if geoaccuracy of input sensor is unknown. One solution for improving the geoaccuracy of detection includes querying the database 117 by the fusion engine 124 to obtain default values if the data source/data collection method is unknown. Another option would be for the fusion engine 124 to fuse this particular detection tag with other detection tags in an effort to reach geoaccuracy thresholds specified by the requirement tag 402 and in order to produce a classification tag 415. In various embodiments, individual fusion engines 124 can determine the optimal way to deal with incomplete data.

FIG. 6 further illustrates transformation of data into information. More specifically, if an image containing a sailboat and sun exists in the data domain 502, the information extraction processes 422 may break it up into two extraction artifacts 424 (image of the sailboat and image of the sun). By processing the extraction artifacts 424, the processing manager 342 generates two detection tags—first tag 414a containing structured information related to the sailboat and second tag 414b containing structured information related to the sun. The first 414a and second 414b tags are in information domain 504. Advantageously, small size of the detection tag 414 enables payloads and platforms hosting various services described above to carry many millions of detections on-board such that each payload can fuse information to create a fused detection tags 414 and/or collection request tags 404. This is a critical capability that enables sensing payload(s) to autonomously fuse information and inform mission manager modules 228 accordingly.

Figure 7:
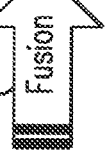
FIG. 7 illustrates generation of a classification tag, in accordance with an embodiment of the present invention.

FIG. 7 illustrates generation of a classification tag 415 (also shown in FIG. 4), in accordance with an embodiment of the present invention. The classification tag 415 contains actionable information (target, type, target's geoposition, Target Location Error (TLE), time, track, confidence probability) that can be communicated to all other domains. As shown in step 326 of FIG. 3, the directive manager 118 generates the classification tag 415 when detection tag 414 is received from the fusion engine 124 which meets or exceeds the thresholds set by the requirements tag 402. If the threshold set by the requirements tag 402 is not met, the directive manager 118 continues to request additional information via collection request tags 404 and/or processing request tags 412, as described above, and continues to send new detection tags 414 to the fusion engine 124. According to an embodiment of the present invention, the directive manager 118 is configured to determine when to generate classification tags 415. FIG. 7 illustrates an example of a plurality of different detection tags 414 that can be fused together to generate the classification tag 415. More specifically, the detection tags generated based on the spectral analysis of the target (first detection tag 414c), infrared analysis of the target (second detection tag 414d), Ground Moving Target Indicator (GMTI) (third detection tag 414e) and signal intelligence analysis (fourth detection tag 414f) having confidence level 45%, 60%, 10% and 75%, respectively, and having ATR reliability at 95%, 95%, 95% and 60%, respectively are fused together by the fusion engine 124. As a result of the fusion, the classification tag 415 is generated having confidence level of 98%.

According to embodiments of the present invention, the fusion engine 124 uses a rigorous statistical approach by which it optimally combines the results from multiple data sources (e.g., ATR modules 102) to improve the detection accuracy, reduce false alarms, and improve the location accuracy of the target. In one embodiment, the fusion engine 124 employs a hierarchical Bayesian framework for this purpose that allows the incorporation of a priori information (e.g., probabilistic distribution) in the final determination to provide much better prediction results. The influence of the information is automatically reduced as more data is collected and fused together. Upon receiving all available information related to a target of interest, the fusion engine 124 performs steps 318-322 shown in FIG. 3.

At step 318, the fusion engine 124 makes a determination of whether the different detection tags of the target of interest represents the same physical target or different physical targets of the same type. In response to determining that the first plurality of detection tags corresponds to more than one physical target of interest, the fusion engine 124 groups the plurality of detection tags into one or more groups based on the physical targets of interest, such that each group contains exclusively detection tags that correspond to a unique physical target. This determination of whether the different detection tags of the target of interest represent the same physical target is complicated by the location uncertainty inherent in various data collection platforms. Simply measuring Euclidean distances between the different detections of the same target type is not an ideal approach due to the different eccentricities and sizes of the uncertainty ellipses produced by the various sensors and imaging geometry. Advantageously, the fusion engine 124 formulates an optimal (normalized) distance measure that takes these differing uncertainties into account to measure distances between the new detections and previous detections of the target of interest. Next, the fusion engine 124 compares this normalized distance to a threshold to make the determination of whether the acquired data represents a new target or a previously acquired target. A priori information of how likely this particular target type is likely to be clustered or isolated in the region of interest is used by the fusion engine 124 to set the threshold in order to make the decision rule adaptive to different scenarios.

Once the determination is made that the new information represents a previously identified target (decision block 318. "Yes" branch), at step 320, the fusion engine 124 performs fusion of detection statistics. More specifically, the fusion engine 124 fuses the statistics from the detections reported by different ATR modules 102 for the target of interest to obtain an updated estimate of the probability of the correct identification of the target. In an embodiment of the present invention, the Bayesian modeling framework is employed by the fusion engine 124 for this purpose, which allows the fusion engine 124 to incorporate information regarding the performance of the particular ATR in determining targets of this type.

The detections generated by the ATR modules 102 are characterized by a produced output statistical distribution that is representative of presence or absence of the target. However, the challenge is to accurately estimate and model this distribution. To address this challenge, in an embodiment, each ATR module 102 may assess a particular collected ground truth data where the target is known to be present or absent and generate statistical target present/absent distributions that characterize its performance. This ground truth data is acquired through exercising the ATR using surrogate targets in flight test experiments run in a variety of conditions.

Figure 8:
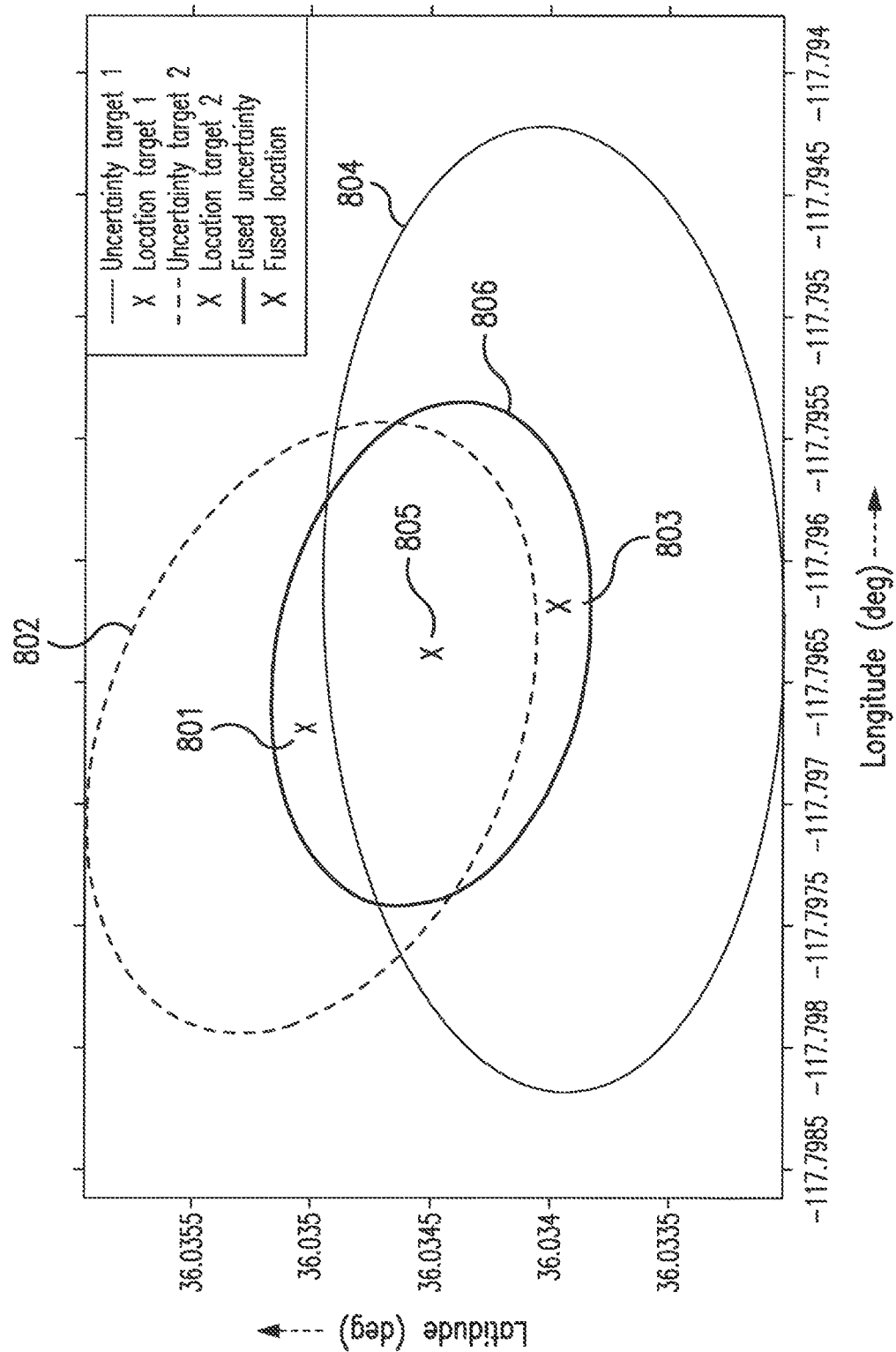
FIG. 8 illustrates fused estimate of the target location obtained by fusion of two detections of the same target, in accordance with an embodiment of the present invention.

The fusion engine 124 also has the capability of learning in real time the reliability of the individual ATRs it is fusing information from if ground truth information is fed back on the detections made by the fusion engine 124. After performing the fusion of detection statistics, at step 322, the fusion engine 124 performs fusion of geolocations statistics. It should be noted that if the fusion engine 124 groups the plurality of detection tags into one or more groups, steps 320 and 322 performed for each group associated with a particular target. FIG. 8 illustrates updated estimate of the target location obtained by fusion of two detections of the same target, in accordance with an embodiment of the present invention. The individual uncertainty ellipses 802 and 804 around the estimated target locations 801 and 803, respectively are calculated based on data (geolocation statistics) collected from different sensors and platforms and contained within the received plurality of detection tags 414. The noise characteristics of the sensors and the imaging geometry determine the distribution of the location of the target associated with each ATR detection. According to an embodiment of the present invention, the distributions representing uncertainty ellipses 802 and 804 can be optimally combined assuming they represent the same physical target. FIG. 8 further illustrates updated estimates of the target location 805 and uncertainty 806 for two detections of the same target determined as a result of fusion performed in step 322. The fused location 805 and uncertainty 806 is an optimal combination of the uncertainty of the two detections.

As noted above, by utilizing the detection tags 414, the fusion engine's 124 primary function is to continuously combine multi-domain information to increase probability of identification of a target in an autonomous fashion. Advantageously, no matter the source of the information, the use of metadata focused solely on common target characteristic allows for computationally and resource light fusion services. This approach to metadata fusion varies dramatically from the processing demands, high costs and security burdens associated with product level fusion found in most other approaches to fusion. Once the fusion engine 124 completes fusion, it generates one or more detection tags containing fused target geospatial information, probability of target identification, and target track if applicable (e.g., for a moving target). The detection tag(s) generated by the fusion engine 124 and containing fused target information is/are transmitted back to the directive manager 118 and/or to one or more services external to the multi-domain operational environment.

If additional information is required to meet thresholds set in the received requirements tags 402, additional collection request 404 and/or processing request tags 412 can be generated by the directive manager 118. Resulting raw data tag 406/detection tag 414 results can then be fused again by the fusion engine 124 along with previously fused detection tags 414 to increase confidence in the extracted information. Each of the plurality of raw data tags 406 indicates availability of data which can be processed to provide additional information. At least in some embodiments, prior to combining the target detection statistics and target geolocation statistics, the fusion engine 124 may be configured to analyze the received plurality of detection tags to determine if one or more of the received detection tags 414 contain incomplete data of interest and may be configured to identify a source containing data which can be processed to provide the incomplete data based on the plurality of raw data tags 406.

In order to effectively fuse results from multiple ATR modules 102, each ATR module 102 supplies to the fusion engine 124 information beyond what target was detected and where. In an embodiment, the ATR modules 102 also supply information regarding its confidence in the supplied detection, as well as statistical information regarding the ATRs overall performance in terms of detecting targets and non-targets (false alarms). This information may also be used for the described fusion processes.

Functionality of the following ADOS enabling components is described in greater detail below: data collection manager 128, service manager 122, security engine 108 and the mission manager software component 228.

The data collection manager 128 is configured and operable to collect operational data from one or more collection resources within time constraints imposed by operational requirements. For example, the collection managers 128 may be configured to handle sensor data collection. As explained above, geopositioning comprises a critical part of metadata. Virtually every sensor will produce geopositioning information such that the location of any detected target is known, but it is far less common that metadata describing the accuracy of the geopositioning information is provided by collection sources. Furthermore, information regarding geopositioning uncertainty is critical to the fusion engine 124 in order to set appropriate collection requirements for further target refinement, to decide whether an object seen in two or more collections is actually the same target or multiple objects, and so on. According to an embodiment of the present invention, the collection manager 128 is configured to generate such metadata based on the collected data.

The service manager 122 (also referred to as a rules engine) is communicatively coupled to the collection manager 128. The service manager 122 is configured and operable to execute a plurality of rules each of which comprise a plurality of conditions grouped in a sequence by a set of logical connectors. The information contained in the metadata tags 402-415 and data analytics typically should be interpreted and transformed into actions or decisions. To accomplish this, one or more (business) rule sets are applied to incoming and available data by the service manager 122. Rules consist of a set of conditions and actions. They define the criteria by which decisions are made or behavior is guided. In various embodiments such rule sets are typically derived from a combination of business intelligence, domain expertise, and hard requirements (e.g. rules of engagement). The result of an applied rule set (the action) could be to kick off a specific workflow by the service manager 122. Each workflow consists of a well-defined collection of tasks (e.g. activities, actions, operations, etc.) which are carried out in a specific sequence. The output product of a workflow applied to collected or available data is information or intelligence.

Figure 9:
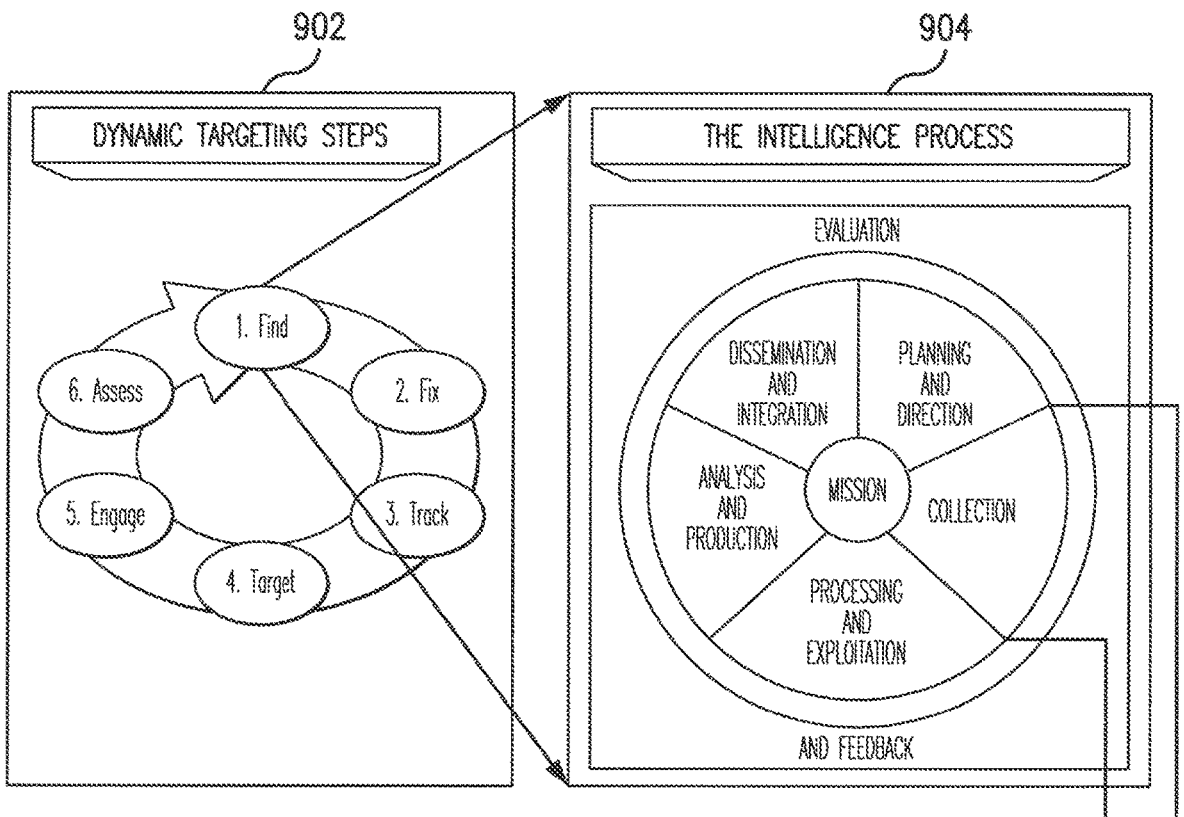
FIG. 9 illustrates the process of parsing workflows to their lowest common denominator or segment, in accordance with an embodiment of the present invention.
Figure 9:
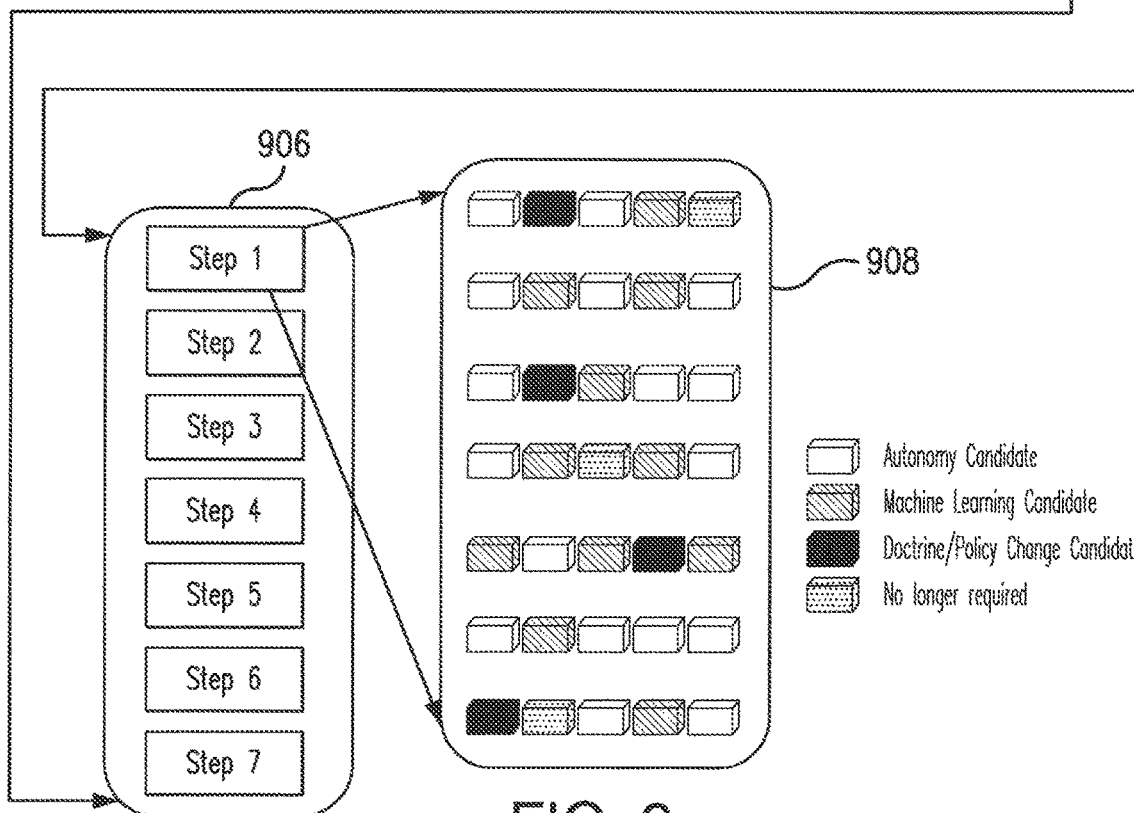

FIG. 9 illustrates the process of parsing workflows to their lowest common denominator or segment, in accordance with an embodiment of the present invention. A first workflow 902 illustrates an exemplary dynamic targeting workflow. The dynamic targeting workflow 902 provides an overview of steps required to find and prosecute a target. This workflow brings together ISR, BMC2 and strike capable assets individual workflow processes. The various organizations that contribute to the dynamic targeting workflow 902 all operate on distinct and separated domains, containing their own workflows, disparate architectures and infrastructures, processes, and command organizations. A second workflow 904 provides an overview of the Planning, Collection, Processing, Analysis, and Dissemination (PC-PAD) intelligence process. In order to automate larger doctrine level workflows, such as first 902 and second 904 workflows, each workflow should be well understood and segmented to the lowest common denominator, or operational process. Once parsed, an analysis of the segments may be performed to determine, for example, whether the individual segment is a candidate for autonomy, whether any segment requires a human-machine interface to enable human in the loop validation, determine most time consuming segments in order to prioritize segment automation and to determine whether a particular segment is still required if operations are automated. FIG. 9 further shows, a lower level collection workflow 906 represented as a sequence of steps 906 and shows classification of segments 908 of the collection workflow's 906 first step. Similar analysis can be performed with each individual higher level workflow component.

According to an embodiment of the present invention, the security engine 108 is communicatively coupled to the data collection manager 128 and the service manager 122. The security engine 108 is configured to facilitate information sharing across multiple security domains based on one or more security protocols. The security engine 108 redacts information of a higher security domain from meta-data such that the meta-data objects can be passed to lower security domain. Domain owners of the data operate information extraction services based upon collection request tags 404 or event triggers to create one or more detection tags 414. These detection tags 414 are then distributed to consumers in any security domain. Again, the detection tag 414 contains no raw data. If security domain-specific information exists within the detection tag 414 for use within its security domain of origin, the security engine 108 is configured to remove this security-domain-specific information from the detection tag 414 prior to dissemination.

The mission manager software component 228 is configured and operable to manage operation of various system components using a common information layer. Functionality of the mission manager 228 is described above in conjunction with FIG. 2. As a non-limiting example, in one embodiment, the mission manager 228 may be configured to cause the service manager 122 to execute a plurality of rules associated with a received mission until a requirement associated with the received mission is satisfied or until a predefined time limit is reached. The plurality of rules may include any automated military workflow. As yet another example, the mission manager 228 may be configured to cause the data collection manager 128 to automatically generate target information specific to a specific collection resource. At least in some embodiments, the mission managers 228 may be configured to generate a requirement tag containing mission requirements information related to one or more targets of interest based on requirements provided by users.

According to an embodiment of the present invention, an information extraction engine may be communicatively coupled to the data collection manager 128 and may include one or more information extraction services 422. In one embodiment, the information extraction engine may be configured to continually receive collected operational data from the data collection manager 128, identify new operational data within the collected operational data and store the identified new operational data in a database. The information extraction engine operates in the domain-specific area, where information from data sources may be extracted in many different ways. Various embodiments of the present invention contemplate autonomous information extraction. Autonomous information extraction techniques, analytics, and machine learning services are known in the art. At least in some embodiments, the information extraction engine may employ an Extract-Transform-Load (ETL) concept.

Figure 10:
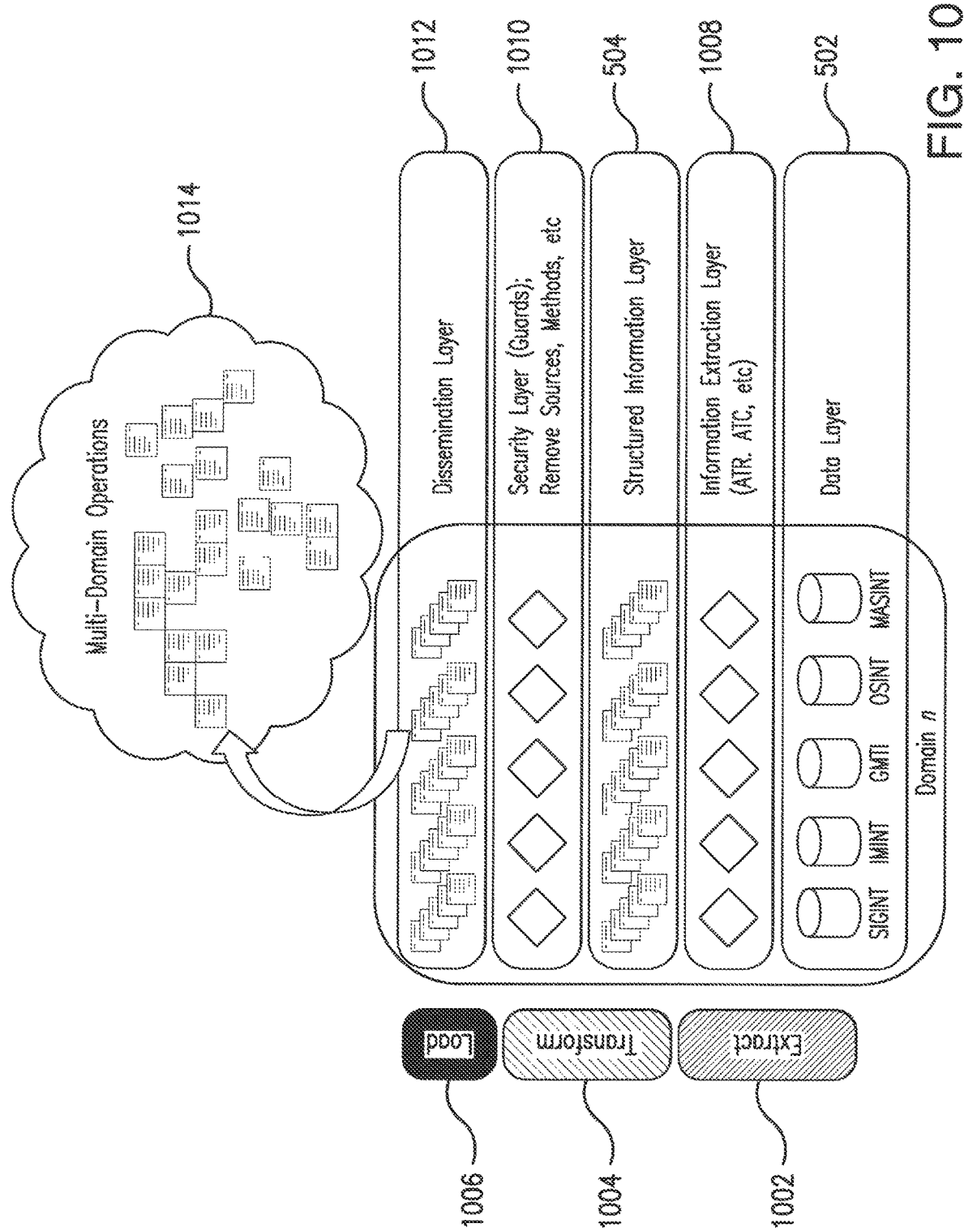
FIG. 10 illustrates information extraction operations in the domain-specific area, in accordance with an embodiment of the present invention.

FIG. 10 illustrates information extraction operations in the domain-specific area, where information from data sources is extracted in many different ways, in accordance with an embodiment of the present invention. As shown in FIG. 0.10, the extract step 1002 of the ETL process can be performed by the data layer 502 and information extraction layer 1008, the transform step 1004 can be performed by the structured information layer 504 and a security layer 1010, while the load step 1006 can be performed by the dissemination layer 1012. These examples show that regardless of the data type, the information extraction engine uses data as an input and creates structured domain agnostic information utilized by the multi-domain operations 1014 as its output. Again, such structured domain-agnostic information typically includes a variety of geospatial information. Statistical information about the model used to extract the information may also be available.

Figure 11:
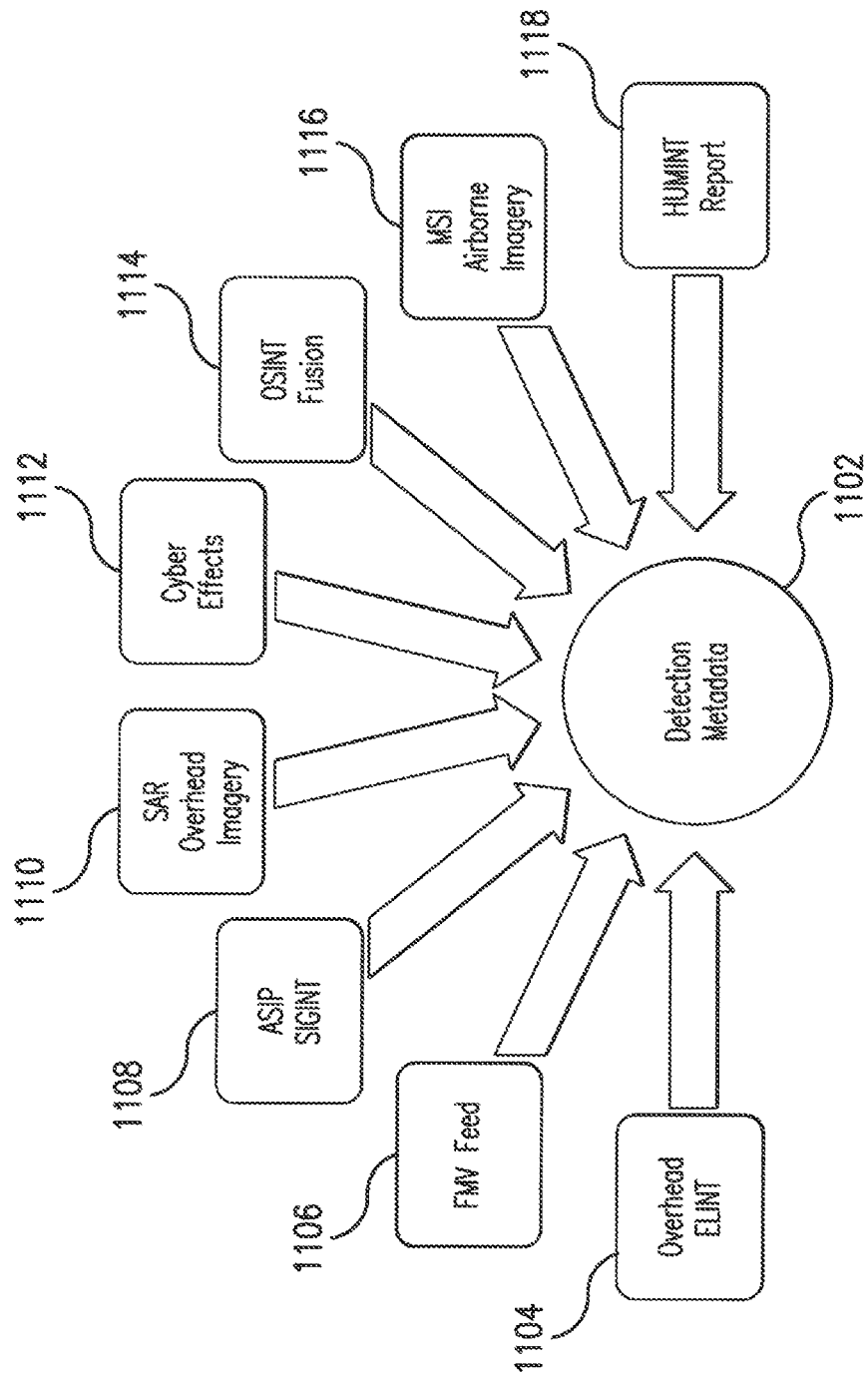
FIG. 11 illustrates a functional block diagram illustrating the ability of extraction process to move operations from the data domain layer to the information domain layer in accordance with an embodiment of the present invention.

According to an embodiment of the present invention, the information extraction engine may be configured to continuously run via autonomous services to continually pull information from data, identify detections, and store them in a database. FIG. 11 is a functional block diagram illustrating the ability of the information extraction engine to move operations from the data domain layer to the information domain layer in accordance with an embodiment of the present invention. In various embodiments data extraction may include image analysis and can be performed using a third party web service such as the GOOGLE® CLOUD VISION API provided by Google Inc. of Menlo Park, Calif. Such services can receive images (e.g., by passing a URL or by passing the image file) and classify the image into thousands of categories (e.g., "sailboat", "lion". "Eiffel Tower") represented in FIG. 11 as detection metadata 1102 extracted from the data provided by a plurality of sources 1104-1118. FIG. 11 illustrates the ability of ETL process to move operations from the data domain 502 to the information domain 504, thus making the information "domain agnostic."

In some embodiments, the information extraction engine may employ machine learning technologies to improve the accuracy and robustness of ATR modules beyond what traditional approaches are capable of. As one non-limiting example, the information extraction engine may employ Convolutional Neural Networks (CNNs) used in deep learning frameworks to automatically recognize objects in imagery. These objects may be dogs and cats, labeling people in photos by name, or recognizing road hazards to have a driverless car not collide with them. CNNs are powerful models that can be configured to be well suited for computer vision problems. CNNs typically perform best when they are large (i.e., more complex), meaning that they have more, deeper and highly-interconnected layers. CNNs may be applied to automatically recognize militarily significant targets of interest in remotely sensed imagery. Primary drawbacks of these CNNs are computational cost and availability of enough sample data of desired targets with which to effectively train the network (for the commercial applications described above, training sets are easily in the thousands of images).

In summary, various embodiments of the present invention are directed to the scalable and flexible MDSC configured to create a common metadata structure at the information layer focused on target centric rules management. MDSC leverages the full host of open source workflow tools, cloud architecture and currently available autonomous technologies to create, fuse, and disseminate information and C2 requests across all domains and to significantly reduce data to decision timelines by introducing autonomy to warfighting workflows. These automated capabilities not only enable the defeat of agile, intelligent targets in the significantly condensed timelines required, but also support more conventional ISR and battle management workflows by reducing the need for manual, resource intensive processes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable. RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN) or WLAN, or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A multi-domain operational system comprising:
at least one memory, each memory configured to store a plurality of programmable instructions; and
at least one processing device in communication with the memory, wherein the at least one processing device, upon execution of the plurality of programmable instructions stored by one of the at least one memory is configured and operable to:
collect operational data from one or more collection resources within time constraints imposed by operational requirements;
execute a plurality of rules each of which comprise a plurality of conditions grouped in a sequence by a set of logical connectors, wherein the plurality of rules is associated with a mission task;
facilitate information sharing across multiple data domains based on one or more security protocols; and
manage at least one of the collection of the operational data, execution of the plurality of rules, and information sharing across the multiple data domains using a common information layer,
wherein the one or more collection resources comprise one or more sensors,
wherein the managing at least one of collection of the operational data, execution of the plurality of rules, and information sharing across the multiple data domains using a common information layer further comprises:
generating a plurality of requirement tags containing mission requirements information related to one or more targets or region of interest (ROI) of interest;
extracting the mission requirements information from the requirement tag into a plurality of detection tags;
combining the information in two or more detection tags into one or more fused detection tags; and
generating one or more classification tags from said fused detection tags containing information relating to the final positive identification of the target of interest.

2. The system of claim 1, wherein managing at least one of the collection of the operational data, execution of the plurality of rules and information sharing across the multiple data domains using a common information layer further comprises causing execution of a plurality of rules associated with a received mission until a requirement associated with the received mission is satisfied or until a predefined time limit is reached.

3. The system of claim 1, wherein the plurality of rules comprises an automated military workflow.

4. The system of claim 1, wherein managing at least one of the collection of the operational data, execution of the plurality of rules, and information sharing across the multiple data domains using a common information layer further comprises causing automatic generation of target information specific to a specific collection resource.

5. The system of claim 1, wherein the at least one processing device, upon execution of the plurality of programmable instructions stored by one of the at least one memory is further configured and operable to:
continually receive collected operational data from the data collection engine;
identify new operational data within the collected operational data; and
store the identified new operational data in a data repository.

6. The system of claim 1, wherein at least one of the one or more collection resources utilizes a trained neural network to identify one or more targets of interest.

7. The system of claim 1, wherein the common information layer comprises a multi-domain service construct configured to synchronize data across a plurality of data domains.

8. The system of claim 7, wherein the multi-domain service construct is implemented in a cloud computing system.

9. One or more non-transitory computer readable storage mediums, each having one or more computer programs embedded therein, which when executed by a computer system of a multi-domain operational system, cause the computer system to:
collect operational data from one or more collection resources within time constraints imposed by operational requirements;
execute a plurality of rules each of which comprise a plurality of conditions grouped in a sequence by a set of logical connectors, wherein the plurality of rules is associated with a mission task;
facilitate information sharing across multiple data domains based on one or more security protocols; and
manage at least one of the collection of the operational data, execution of the plurality of rules, and information sharing across the multiple data domains using a common information layer,
wherein the one or more collection resources comprise one or more sensors,
wherein the managing at least one of collection of the operational data, execution of the plurality of rules, and information sharing across the multiple data domains using a common information layer further comprises:
generating a plurality of requirement tags containing mission requirements information related to one or more targets or region of interest (ROI) of interest;
extracting the mission requirements information from the requirement tag into a plurality of detection tags;
combining the information in two or more detection tags into one or more fused detection tags; and
generating one or more classification tags from said fused detection tags containing information relating to the final positive identification of the target of interest.

10. The non-transitory computer readable storage medium of claim 9, wherein managing at least one of the collection of the operational data, execution of the plurality of rules, and information sharing across multiple data domains further comprises executing a plurality of rules associated with a received mission until a requirement associated with the received mission is satisfied or until a predefined time limit is reached.

11. The non-transitory computer readable storage medium of claim 9, wherein the plurality of rules comprises an automated military workflow.

12. The non-transitory computer readable storage medium of claim 9, wherein managing at least one of the collection of the operational data, execution of the plurality of rules, and information sharing across multiple data domains further comprises automatically generating target information specific to a specific collection resource.

13. The non-transitory computer readable storage medium of claim 9, wherein the one or more computer programs, when executed by the computer system of the multi-domain operational system further cause the computer system to:
   continually receive collected operational data from the one or more collection resources;
   identify new operational data within the collected operational data; and
   store the identified new operational data in a data repository.

14. The non-transitory computer readable storage medium of claim 9, wherein at least one of the one or more collection resources utilizes a trained neural network to identify one or more targets of interest.

15. The non-transitory computer readable storage medium of claim 9, wherein the common information layer comprises a multi-domain service construct configured to synchronize data across a plurality of data domains.

16. The non-transitory computer readable storage medium of claim 15, wherein the multi-domain service construct is implemented in a cloud computing system.

\* \* \* \* \*